United States Patent [19]

Picon et al.

[11] Patent Number: 4,751,703
[45] Date of Patent: Jun. 14, 1988

[54] METHOD FOR STORING THE CONTROL CODE OF A PROCESSOR ALLOWING EFFECTIVE CODE MODIFICATION AND ADDRESSING CIRCUIT THEREFOR

[75] Inventors: Joaquin Picon, St. Laurent du Var; Clement Y. G. Poiraud, Cagnes sur Mer; Daniel Sazbon-Natansohn, Villeneuve Loubet, all of France

[73] Assignee: International Business Machines Corp., Armonk, N.Y.

[21] Appl. No.: 908,114

[22] Filed: Sep. 16, 1986

[51] Int. Cl.$^4$ ............................ G06F 9/00; G06F 7/00
[52] U.S. Cl. ...................................... 371/10; 364/200; 364/900; 365/200
[58] Field of Search .................. 364/200, 900; 371/10, 371/21, 7, 15; 365/200, 94, 104

[56] References Cited

U.S. PATENT DOCUMENTS

| | | | |
|---|---|---|---|
| 3,959,783 | 5/1976 | Fressineau | 365/200 |
| 4,080,648 | 3/1978 | Asano | 364/200 |
| 4,141,068 | 2/1979 | Mager | 354/200 |
| 4,308,590 | 12/1981 | Stettmaier | 364/900 |
| 4,334,268 | 6/1982 | Boney | 364/200 |
| 4,542,453 | 9/1985 | Patrick | 364/200 |

FOREIGN PATENT DOCUMENTS 2854976 6/1980 Fed. Rep. of Germany.

OTHER PUBLICATIONS

Lehman, M., IBM Tech Disclosure Bulletin, "Variable Memory Structure", vol. 9, No. 9, Feb. 1967.

Primary Examiner—Michael R. Fleming
Attorney, Agent, or Firm—John B. Frisone

[57] ABSTRACT

A method for storing the control code of a processor in a read only memory ROM (5) and in a read/write memory RAM (7) comprising a code area and a patch area. It consists in virtually dividing the control code in blocks of n instructions, storing the first instruction of each block into the code area of the read/write memory, and storing the n−1 following instructions of each block in the read only memory ROM. When an error is detected in at least one block, the first instruction of said block normally stored in the read/write RAM, is replaced by a branch instruction containing a branch address value so as to point to the patch area where the corrected block is stored.

This method is implemented using a specific addressing circuit.

7 Claims, 2 Drawing Sheets

METHOD FOR STORING THE CONTROL CODE OF A PROCESSOR ALLOWING EFFECTIVE CODE MODIFICATION AND ADDRESSING CIRCUIT THEREFOR

DESCRIPTION OF THE INVENTION

1. Technical Field

This invention relates to a method for patching the code contained in a read only memory and an addressing circuit therefor.

2. Background Art

A problem encountered in all processors working under control of a code or program built in a read only memory ROM is that the code, once stored, cannot be modified if a design problem or a malfunction occurs, so that no correction is possible.

A known solution to this problem consists in replacing the ROM module in error by a new module containing the corrected code. This solution is not acceptable for manufactured machines produced in high volumes and delivered to million of customers. tomers.

It is also not possible to have the code written in read/write memories RAM since this kind of memories have low densities and are more expensive than read only memories.

Using RAM memories as patch memories for the code to be replaced is already known. Such technique implies that the code designer provides in the code, branch instructions at selected places, to point to RAM locations where the corrected code is stored when an error is detected. To implement this solution, the programmer has to select the places where the branch instructions are needed, i.e. he must select the places where the likelihood that errors occur is high. The performance of the machines working under control of such a code is impaired, since branch instructions have to be executed even if there is no error.

SUMMARY OF THE INVENTION

Consequently, an object of the invention is to provide a method for storing the control code of the machine in such a way that the code may be corrected if an error is detected without impairing the processor performance.

Another object of the invention is to provide an addressing mechanism for implementing said method.

The method according to the invention consists in storing the code in a read only memory ROM and in a read/write memory RAM in the following way. The majority of the code is stored in the ROM memory and one instruction in every n instructions is stored in the RAM memory. To do this the code is virtually divided in blocks containing n instructions and the first instruction of each block is stored in the RAM memory and the n-1 following instructions are stored in the ROM memory. When a malfunction occurs during the execution of at least one instruction of a so defined block, the corresponding corrected block is stored in the RAM. The instruction located in the RAM memory preceding the block in error is changed to a branch instruction pointing to the corrected code.

The k-bit addresses of the instructions are provided as usual on a code address bus. In case n is equal to a power of 2, the k−x most significant bits (with $n=2^x$) define the addresses of the instructions to be stored and executed from the RAM memory instead of the ROM memory.

The addressing circuit is able of recognizing this address property in order to fetch the instructions which are stored in the RAM memory instead of the ROM memory at locations defined by the k−x most significant bits of the code address.

DETAILED DESCRIPTION OF THE INVENTION

Figure 1:
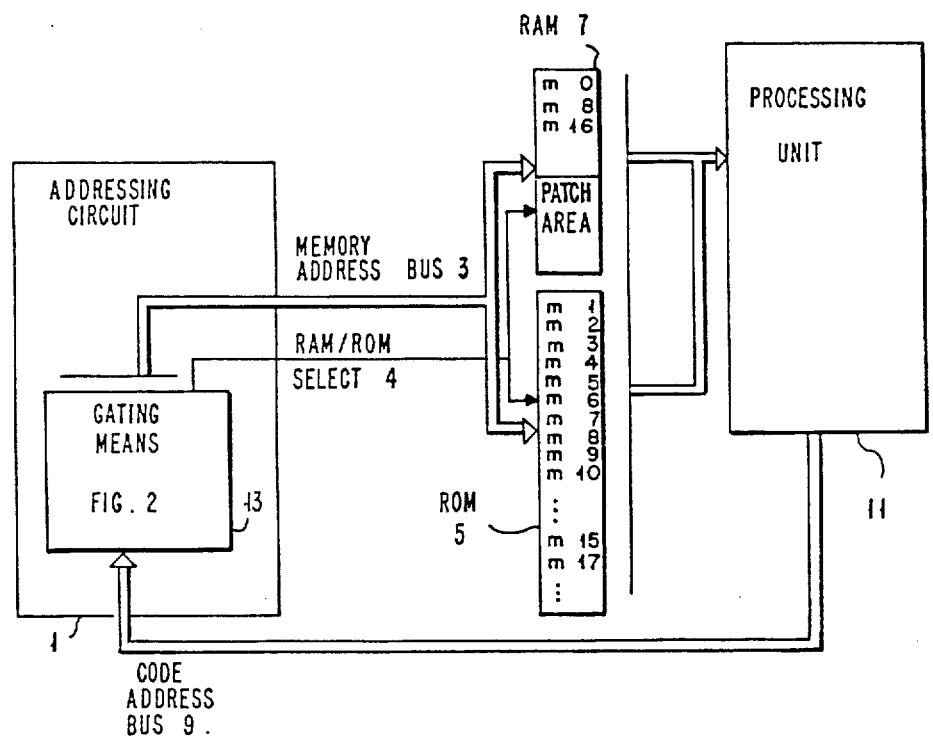
FIG. 1 shows a processor wherein the method according to the present invention is implemented.

As shown in FIG. 1, the processor wherein the method of the invention is implemented, comprises an addressing circuit 1 which generates the memory address bits which are provided to the ROM memory 5 and to RAM memory 7 on bus 3 from the code address bits provided on the code address bus 9 from the processing unit 11.

The address bits from bus 9 are provided to gating means 13 which provides the memory address bits on bus 3 and a RAM/ROM memory selection signal on line 4, said memory address bits and said selection signal causing RAM memory 7 or ROM memory 5 to be accessed depending upon the value of the x least significant bits of the code address.

In a preferred embodiment of the invention x is chosen equal to 3, which means that one instruction every eight instructions is stored in the RAM and the three least significant bits of the address are tested. If they are equal to 0, the gating means provide a select signal on line 4 which is active for selecting the RAM memory and also provide on bus 3, the k−x most significant address bits of the code address to access the desired RAM location except when the patch area of the RAM memory is addressed due to the execution of a branch instruction to the patch area. If the least significant bits of the code address are not equal to 0, the gating means provide a select signal on line 4 which is active for selecting the ROM memory and the k code address bits are provided to bus 3 to access the desired ROM location.

As schematically shown in FIG. 1, ROM memory 5 contains instructions m1, m2 . . . m7; m9 . . . .m15; m17 . . . etc and RAM memory 7 contains instructions m0, m8, m16 etc . . . Thus the code is run in the following way: first instruction m0 from RAM 7, then seven instructions m1 to m7 from ROM 5, then instruction m8 from RAM 7 etc . . . .

RAM memory 7 has a code area which contains instructions as above defined and a patch area used for patching the blocks containing errors. When such a block is found, the corrected block including the instruction normally stored in the RAM memory, is stored in the patch area at an address which is found in the RAM location normally containing the first instruction of the block. This means that the content of this location is changed to a branch address value.

Thus, when this RAM memory location is addressed, a branch to the patch area occurs and the corrected instruction block is run instead of the ROM block containing the error.

At the end of the corrected block stored in the RAM patch area, a patch is stored so as to come back to the normal code running.

The branch address has a specific configuration. This insures that when the corrected code is run in RAM memory, no shifting of the code address on bus 9 occurs till the branch instruction at the end of the corrected block is executed, so that during the time that the patch area is accessed, the select signal on line 4 is active to select the RAM and the memory address bits on bus 3 are identical to the code address bits on bus 9.

Figure 2:
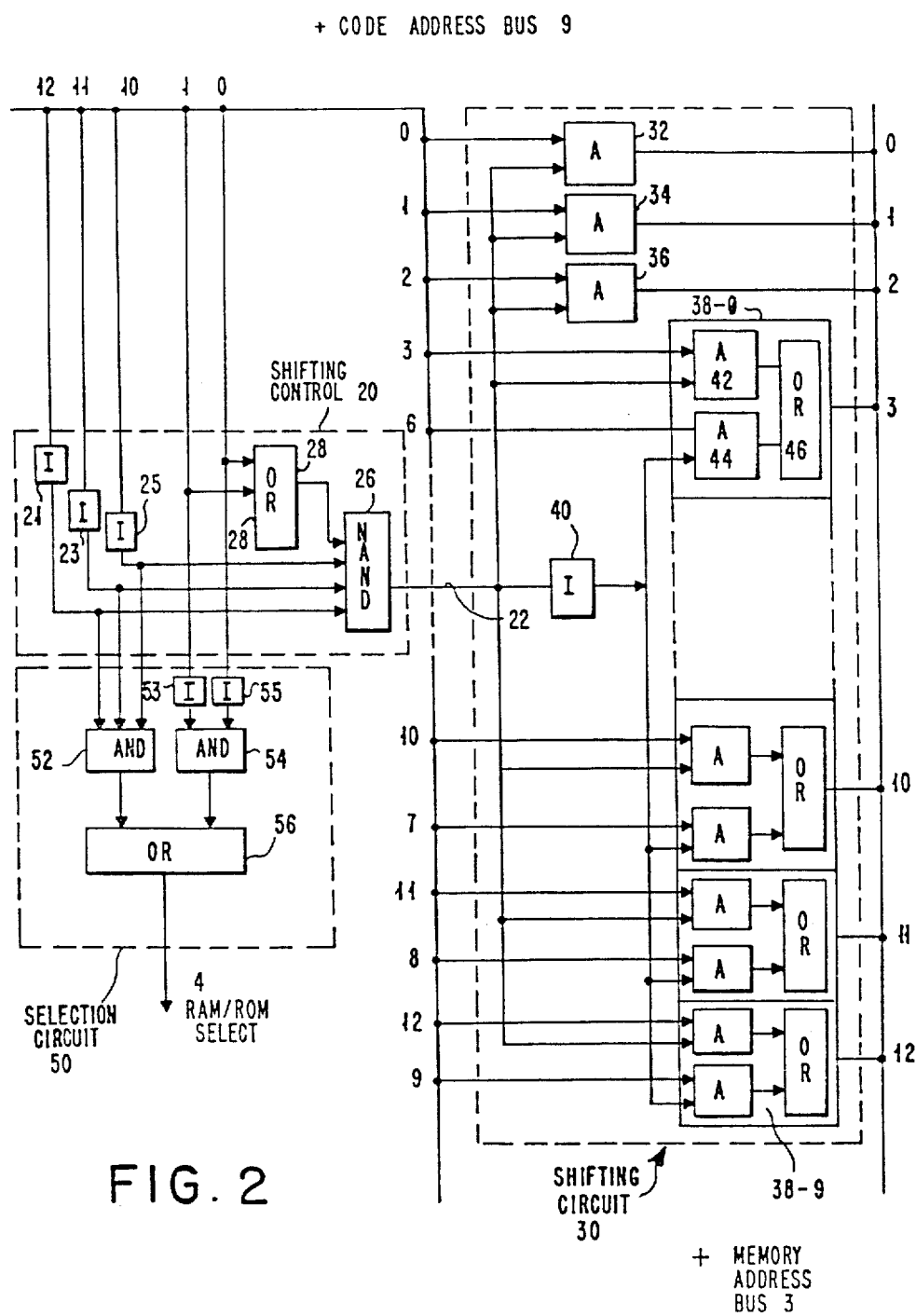
FIG. 2 shows the addressing circuit allowing the method of the invention to be implemented.

FIG. 2 shows an addressing circuit which generates the memory address bits on bus 3 and the RAM/ROM select signal on line 4 in the specific case where k is chosen equal to 13 and x is equal to 3. The man skilled in the art will be able to modify this circuit in case k and x have different values.

Shifting control circuit 20 generates on its output line 22 a shifting control signal which is active to cause the code address bits on bus 9 to be shifted towards the least significant bits when the instructions in the code area of the RAM are accessed. The shifting control signal on output line 22 has to be inactive when the patch area of the RAM is accessed i.e. when the RAM address is provided through the decoding of the branch instruction read from the RAM code area to point on the corrected block in the patch area.

Shifting control circuit 20 comprises NAND gate 26 which receives on three of its inputs, the three least significant bits 12, 11, 10 inverted by means of inverters 21, 23, 25 of the code address from bus 9 and on its fourth input an inhibit signal which is only active (level 0) when the patch area of RAM 7 is addressed (bits 0 and 1=0). Thus when the three least significant bits of the code address are at 0 and when the patch area is not addressed the output signal on line 22 is active at level 0 so as to cause the address bits on bus 9 to be shifted in shifting circuit 30, as will be described later on. When a patch is implemented into the RAM, the content of code RAM location preceding the block in error is changed to a branch instruction pointing on a patch area location.

Since the patch area addresses may have their three least significant bits at 0 at a moment, the shifting control signal on line 22 has to be inactive (level 1) at that time. Thus, in a specific embodiment of the invention where the RAM addresses have their two most significant bits always at 0 and the ROM addresses have always at least one of the two most significant bits at 1, when the two most significant bits of the code address on bus 9 are at 0, which means that a branch instruction to the patch area is to be executed, the shifting control signal is made inactive (level 1) even if bits 12, 11 and 10 are at 0. Most significant bits 0 and 1 of the code address on bus 9 are provided to OR circuit 28. Thus when these bits are equal to 0, OR circuit 28 which has its output connected to the inhibit input of NAND gate 26 prevents the shifting control signal on line 22 from being active. Circuit 30 comprises AND gates 32, 34, 36, logic circuit 38-0 to 38-9 and inverter 40.

The first inputs of AND gates 32, 34 and 36 receive bits 0, 1 and 2 respectively, from code address bus 9. Output line 22 of NAND gate 26 is connected to the second inputs of these AND gates 32, 34 and 36 so that, when the shifting control signal is active at level 0, these AND gates provide 0 output signals which are bits 0, 1, 2 of memory address bits on bus 3.

If shifting control signal on line 22 is inactive i.e. at level 1, AND gates provide bits 0, 1, 2 of the code address on bus 9 as bits 0, 1, 2 of the memory address on bus 3.

Each one of circuit 38-0 to 38-9 receives two bits of the code address on bus 9 so as to provide on their outputs one or the other of said bits depending whether the shifting control signal on line 22 is active or not. For example circuit 38-0 receives bits 3 and 0 from code address bus 9 and provides on its output bit 3 when shifting control signal is inactive (no shift) and bit 0 when shifting control signal is active. This causes the code address bits on bus 9 to be shifted towards the least significant bits on memory address bus 3 when the shift control signal is active.

Logic circuit 38-0 to 38-9 comprises two AND gates 42 and 44 and OR gate 46. For example in circuit 38-0, AND gate 42 receives bit 3 of the code address on bus 9 and the shifting control signal and AND gate 44 receives bit 0 of the code address from bus 9 and the shifting control signal inverted in inverter 40. OR gate 46 is connected to the outputs of AND gates 42 and 44. Thus when the shifting control signal is active (level 0), the output of AND gate 42 is at a 0 level and AND gate 44 provides bit 0 of the code address to OR circuit 46. Thus bit 3 of memory address on bus 3 is equal to bit 0 of the code address.

When the shifting control signal is inactive, AND gate 44 provides a 0 output signal and AND gate 42 provides bit 3 of the code address to OR circuit 46. Thus bit 3 of memory address on bus 3 is equal to bit 3 of the code address.

Selection circuit 50 provides the RAM/ROM select signal on its output line 4. For example this signal is at level 1 when the RAM is to be selected and at level 0 when the ROM is to be selected.

It comprises two AND gates 52 and 54 and OR gate 56. The inputs of AND gate 52 receive the inverse of bits 12, 11, and 10 of the code address from bus 9 so as to provide an output signal at 1 when these bits are at 0, which means that the RAM is to be addressed. The inputs of AND gate 54 receive bits 0 and 1 of code address from bus 9 inverted by means of inverters 53 and 55 so as to provide an output signal at 1 when these bits are at 0 which means that the patch area of RAM memory 7 is to be addressed.

The outputs of AND gates 52, 54 are provided to OR gate 56 which thus generates on its output 4 the RAM/ROM select signal.

We claim:

1. A method for storing the control code of a processor in a composite memory which includes a read only memory ROM (5) and a read/write random access memory RAM (7) comprising the following steps:
   partitioning the control code into blocks of n successive instructions where n is an integer greater than two (2);
   storing the first instruction in each of said instruction blocks in the RAM memory and the remaining n-1 instructions in each said block in the ROM memory; and
   when an error in a given block in the ROM memory is present, replacing the first instruction in the said given block stored in the RAM memory by a branch instruction which points to a predetermined patch area in the said RAM memory and storing the corrected n−1 following instructions of the said given block in the patch area in the RAM memory to which the said branch instruction points 2. Method according to claim 1 characterized in that n is equal to a power of 2.

3. In a processor system which includes a memory for storing the instructions which make up the processor control code which are addressed by processor generated addresses each including k bits which are supplied to said memory over a k bit memory address bus, said processor control code being divided into a plurality of equal length blocks each having n instructions where n is an integer greater than two, said memory comprising:

a read only memory ROM for storing all but the first instruction of the control code of each said block of instruction control code;

a read/write random access memory RAM having a first part for storing the first instruction of the control code of each said block which contains no errors and a pointer address in lieu of said corresponding first instruction which points to a second patch part of the RAM memory which contains the correct n-1 instruction codes for each of those blocks in the ROM memory which contain errors, said pointer address having k bits of which selected bits have a first predetermined configuration; and an addressing circuit responsive to the k address bits received over the address bus for addressing said RAM memory when said k selected bits have the said first predetermined configuration or a second predetermined configuration and for addressing said ROM memory when said k selected bits do not have either said first or second predetermined configuration.

4. A system according to claim 3, characterized in that the addressing circuit comprises:

gating means responsive to the k code address bits and generating therefrom a memory select signal and RAM memory or ROM memory address bits which are identical to the received address bits, when the memory select signal selects the $(k-x)$ most significant bits of the address, when the memory select signal selects the RAM memory where x is an integer.

5. A system according to claim 4, characterized in that the gating means comprises:

shifting control means (20) which generates a shifting control signal which is active when the x least significant bits of the code address are equal to 0 except when the patch area of the RAM memory is selected;

shifting means (30) receiving the k address bits and generating memory address bits, said memory address bits being identical to the k address bits when the shifting control signal selects the ROM and being equal to the $k-x$ least significant bits of the address when the shifting control signal selects the RAM.

6. A system according to claim 5, characterized in that the shifting means comprises:

means (32, 34, 36) responsive to the shifting control signal for setting the x most significant bits of the memory address to 0 when the shifting control signal is active.

7. A system according to claim 3 or 4 characterized in that the gating means comprises:

means (50) which are sensitive to the three least significant bits of the address and to at least one of the most significant bits of the address for generating the RAM/ROM select signal.

* * * * *